United States Patent [19]
Kura

[11] Patent Number: 6,052,350
[45] Date of Patent: Apr. 18, 2000

[54] DIGITAL SIGNAL REPRODUCTION CIRCUIT AND DIGITAL SIGNAL REPRODUCTION METHOD

[75] Inventor: Jumpei Kura, Tokyo, Japan

[73] Assignee: Sony Corporation, Tokyo, Japan

[21] Appl. No.: 08/958,010

[22] Filed: Oct. 27, 1997

[30]     Foreign Application Priority Data

Oct. 29, 1996 [JP] Japan .................................. 8-287107
Dec. 11, 1996 [JP] Japan .................................. 8-331278

[51] Int. Cl.[7] ....................................................... G11B 7/00
[52] U.S. Cl. .................................. 369/59; 369/50; 369/48
[58] Field of Search .................................. 369/59, 47, 48,
369/49, 50, 54, 58, 60, 32, 124, 44.27,
44.28, 44.34; 360/48, 51, 39, 36.2, 37.1,
46

[56]          References Cited

U.S. PATENT DOCUMENTS

| 4,005,477 | 1/1977 | Ottesen ........................................ 360/51 |
| 4,615,037 | 9/1986 | Adler ............................................ 375/12 |
| 4,813,031 | 3/1989 | Bierhoff .................................... 369/44.34 |

FOREIGN PATENT DOCUMENTS 0 524 559 A2   1/1993   European Pat. Off. .
   8-154053    6/1996   Japan .

OTHER PUBLICATIONS

Patent Abstracts of Japan, vol. 096, No. 011, Nov. 29, 1996 & JP 08 180589 A (Canon Inc), Jul. 12, 1996.
Patent Abstracts of Japan, vol. 014, No. 354 (E–0958), Jul. 31, 1990 & JP 02 122734 A (Hitachi Ltd), May 10, 1990.

*Primary Examiner*—Muhammad Edun
*Attorney, Agent, or Firm*—Frommer Lawrence & Haug, LLP.; William S. Frommer

[57]          ABSTRACT

The present invention provides a digital signal reproduction circuit capable of controlling a transfer function of waveform equalization circuit so that a synchronous clock can be generated with an optimal transfer characteristic. The digital signal reproduction circuit 1 includes: a waveform equalization block for waveform-equalizing a regenerative signal; a binarization block 20 for binarizing the regenerative signal which has been waveform-equalized; a synchronous clock reproduction block 30 for generating a synchronous clock from the signal binarized; and a waveform equalization control block 40 for controlling a transfer function of the waveform equalization block 10 according to a jitter component between the synchronous clock and the binarized signal. The waveform equalization control block 40 is supplied with a phase difference signal between the binarized signal and the synchronous signal, so as to obtain an optimal value of the transfer function of the waveform equalization block 10 by using a microcomputer, for example. The transfer function is controlled so as to reduce the jitter component of the synchronous clock.

14 Claims, 15 Drawing Sheets

FIG.13A SAMPLING CLOCK

FIG.13B PIT

FIG.13C INPUT SIGNAL

DIGITAL SIGNAL REPRODUCTION CIRCUIT AND DIGITAL SIGNAL REPRODUCTION METHOD

BACKGROUND OF THE INVENTION

1. Field of the Invention

The present invention relates to a digital signal reproduction circuit and a digital signal reproduction method and particularly, to a digital signal reproduction circuit and a digital signal reproduction method in which a signal supplied is waveform-equalized so as to reproduce the digital signal and a synchronization clock of this digital signal.

2. Description of the Prior Art

For example, in an optical disc reproduction apparatus, an optical-magnetic disc reproduction apparatus or the like, a signal reproduced from an optical pickup is converted into binary data so as to generate a digital signal and a synchronous signal which is synchronized with this digital signal. Especially when reproducing a recording medium in which data is recorded with a high density, a signal reproduced from the optical pickup is waveform-equalized and after this, the data is converted into a binary data, so as to generate a digital signal or the like. The reason why this waveform equalization is carried out is that the signal to be reproduced from the recording medium of a high density has a band up to the vicinity of a spatial shield frequency and contains data having sign components which may interfere with one another. This sign interference can be eliminated by the waveform equalization, and a digital signal generated has less errors, enabling to reproduce a data correctly.

The waveform equalization is realized by a waveform equalization circuit having a predetermined transfer function. In general, the transfer function of the waveform equalization circuit is adjusted, before shipment, according to the optical pickup characteristics, and after shipment, the transfer function is fixed to this adjustment without being changed.

However, the optimal value of the transfer function of the waveform equalization circuit depends on the optical pickup characteristics and a recording condition of a signal recorded in a recording medium. Consequently, if this transfer function of the waveform equalization circuit is fixed to a certain value, it is impossible to obtain an optimal value in accordance with a change of characteristics caused by a temperature change or simply by a time lapse and a difference in the signal recording condition caused by the recording medium. Therefore, in the where case the transfer function is fixed, reproduced data may have a deteriorated quality with a higher error rate depending on the reproduction condition.

SUMMARY OF THE INVENTION

It is therefore an object of the present invention to provide a digital signal reproduction circuit and a digital signal reproduction method capable of offering an optimal transfer characteristic by controlling the transfer function of the waveform equalization circuit.

In order to achieve the aforementioned object, the present invention provides a digital signal reproduction circuit which includes: waveform equalization means for waveform-equalizing with a predetermined transfer function a transfer signal for transferring a digital information; binarization means for generating a digital signal from the transfer signal by binarizing the transfer signal which has been waveform-equalized by the waveform equalization means; synchronous clock generation means for generating a synchronous clock from the digital signal generated by the binarization means; and waveform equalization control means for controlling a transfer function of the waveform equalization means according to a phase difference between the digital signal generated by the binarization means and the clock, wherein the waveform equalization control means controls the transfer function of the waveform equalization means so as to reduce the phase difference.

The aforementioned digital signal reproduction circuit is supplied with a transfer signal and outputs a digital signal and its synchronous clock. This digital signal reproduction circuits detects a phase difference between the digital signal outputted and the synchronous clock of this digital signal, and returns the phase difference to the waveform equalization means, so that the transfer function of the waveform equalization means is varied so as to reduce the phase difference, enabling to reduce interference between signs of the digital information transferred by the transfer signal.

According to another aspect of the present invention, there is provided a digital signal reproduction circuit for reproducing a digital signal and a synchronous clock thereof from a transfer signal for transferring a digital information, the circuit including: waveform equalization means for waveform-equalizing the transfer signal with a predetermined transfer function; analog-to-digital conversion means for converting the transfer signal for transferring a digital information into a digital data transfer signal, using the synchronous clock as a sampling clock; binarization means for binarizing the digital data transfer signal so as to generate a digital signal from the transfer signal for transferring a digital information; phase difference detecting means for detecting a phase difference between the transfer signal which has been waveform-equalized by the waveform equalization means and the synchronous clock, according to the digital data transfer signal; synchronous clock generating means for generating a synchronous clock synchronized with the transfer signal which has been waveform-equalized, according to the phase difference detected by the phase difference detecting means; and waveform equalization control means for controlling the transfer function of the waveform equalization means according to the phase difference detected by the phase difference detection means, wherein the waveform equalization control means controls the transfer function of the waveform equalization means so as to reduce the phase difference.

The aforementioned digital signal reproduction circuit is supplied with a transfer signal and outputs a digital signal and a synchronous clock of this digital signal by using the analog-to-digital converting means. This digital signal reproduction circuit returns as a sampling clock the synchronous clock generated to the analog-to-digital converting means, so as to detect a phase difference between the transfer signal which has been waveform-equalized and the aforementioned synchronous clock. The digital signal reproduction circuit modifies the transfer function of the aforementioned waveform equalization means so as to reduce the phase difference, enabling to reduce interference between signs of the digital information transferred by the transfer signal.

According to still another aspect of the present invention, there is provided a digital signal reproduction method comprising steps of: waveform-equalizing with a predetermined transfer function a transfer signal for transferring a digital information; binarizing the transfer signal which has been waveform-equalized, so as to generate a digital data from the transfer signal; detecting a phase difference between the digital signal and a synchronous clock which is generated from this digital signal; and varying the transfer function according to the phase difference, so as to reduce the phase difference.

According to yet another aspect of the present invention, there is provided a digital signal reproduction method for reproducing a digital signal and a synchronous clock thereof from a transfer signal for transferring a digital information, the method comprising steps of: waveform-equalizing the transfer signal for transferring the digital information, with a predetermined transfer function; converting the transfer signal for transferring the digital information, into a digital data transfer signal, using the synchronous clock as a sampling clock; binarizing the digital data transfer signal so as to generate a digital signal from the transfer signal for transferring the digital information; detecting a phase difference between the transfer signal which has been waveform-equalized and the synchronous clock, according to the digital data transfer signal; generating, according to the phase difference detected, a synchronous clock synchronized with the transfer signal which has been waveform-equalized; and varying the transfer function according to the phase difference, so as to reduce the phase difference.

DETAILED DESCRIPTION OF THE INVENTION

The digital signal reproduction circuit according to the present invention can be applied to an optical disk reproduction apparatus. In this case, the digital signal reproduction circuit is employed as a digital signal reproduction circuit which is supplied with a regenerative signal outputted from an optical pickup and outputs a binarization signal and a synchronous clock.

Description will now be directed to the digital signal reproduction circuit according to the present invention when applied to an optical disc reproduction apparatus, with reference to the attached drawings.

Figure 1:
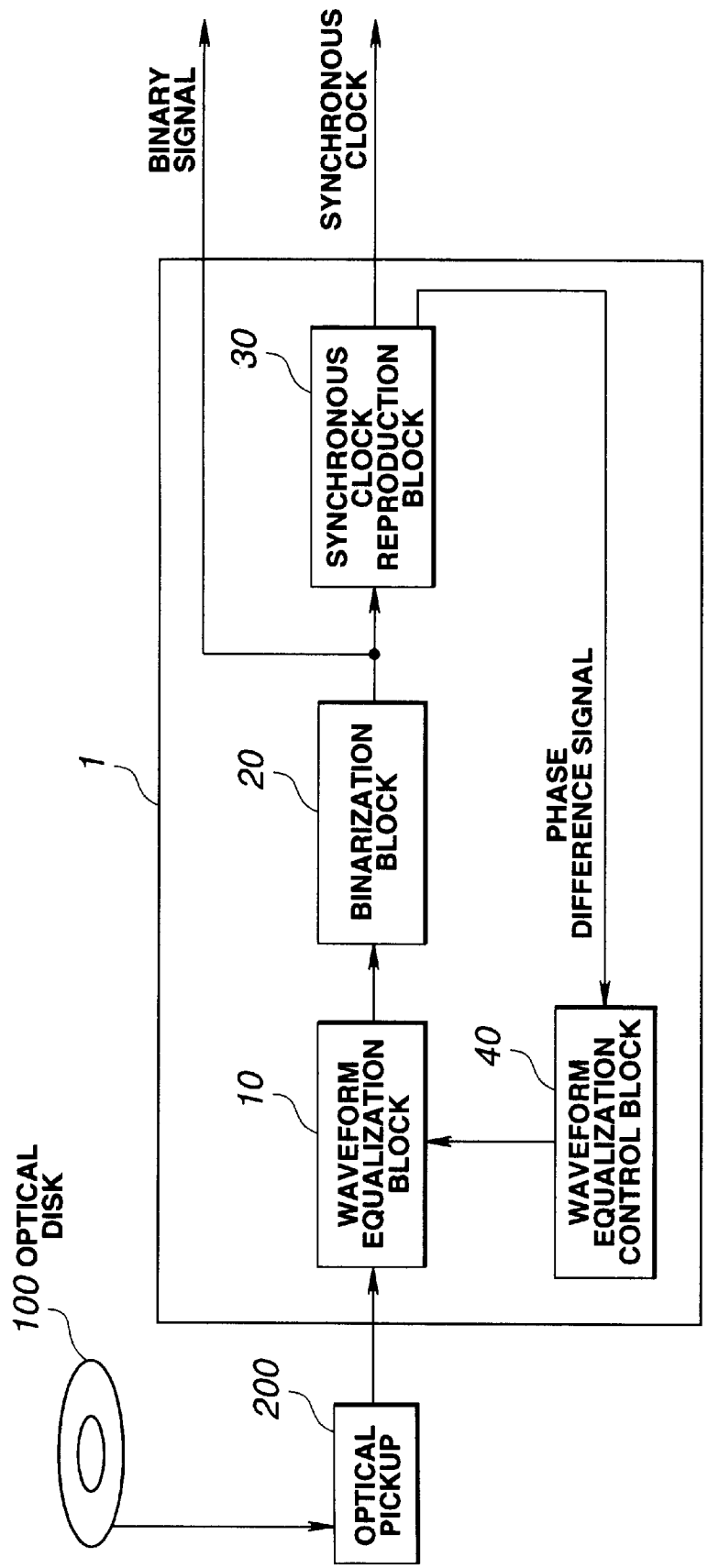
FIG. 1 is a block diagram showing a digital signal reproduction circuit according to a first embodiment of the present invention.

FIG. 1 is a block diagram showing a digital signal reproduction circuit 1 according to a first embodiment of the present invention which includes: a waveform equalization block 10 for waveform-equalizing a regenerative signal from an optical pickup 200 which reproduces a signal recorded in an optical disk 100; a binarization block 20 for binarizing the regenerative signal which has been waveform-equalized; a synchronous clock reproduction block 30 for generating a synchronous clock from the signal which has been binarized; and a waveform equalization control block 40 for controlling a transfer function of the waveform equalization block 10 according to a jitter component between the synchronous clock and the binary signal.

The digital signal reproduction circuit 1 according to this first embodiment controls the transfer function of the waveform equalization block 10 so as to reduce the jitter component between the binary signal and the synchronous clock which are outputted from the digital signal reproduction circuit 1, thus containing the quality of the reproduced data.

The waveform equalization block 10 waveform-equalizes the regenerative signal supplied from the optical pickup 200. The waveform equalization block 10 is formed as a filter circuit having a predetermined transfer function, which is controlled by the waveform equalization control block 40 so as to reduce the jitter component between the binary signal and the synchronous clock. The internal configuration of this waveform equalization block 10 and a control procedure of the transfer function carried out by the waveform equalization block 40 will be detailed later. The regenerative signal which has been waveform-equalized by the waveform equalization block 10 is supplied to the binarization block 20.

The binarization block 20 binarizes the regenerative signal supplied from the waveform equalization block 10 and generates a binary signal which is a digital signal. This binarization is carried out, for example, by comparing a regenerative signal supplied, with a predetermined threshold value so as to determine whether the regenerative signal exceeds or does not exceed the threshold value, thus converting the signal into two values. The binary signal which has been binarized is supplied to the synchronous clock reproduction block 30. This binary signal is also supplied to a decoding block or the like of an optical disk reproduction apparatus (not depicted) which carries out digital signal processing.

Figure 2:
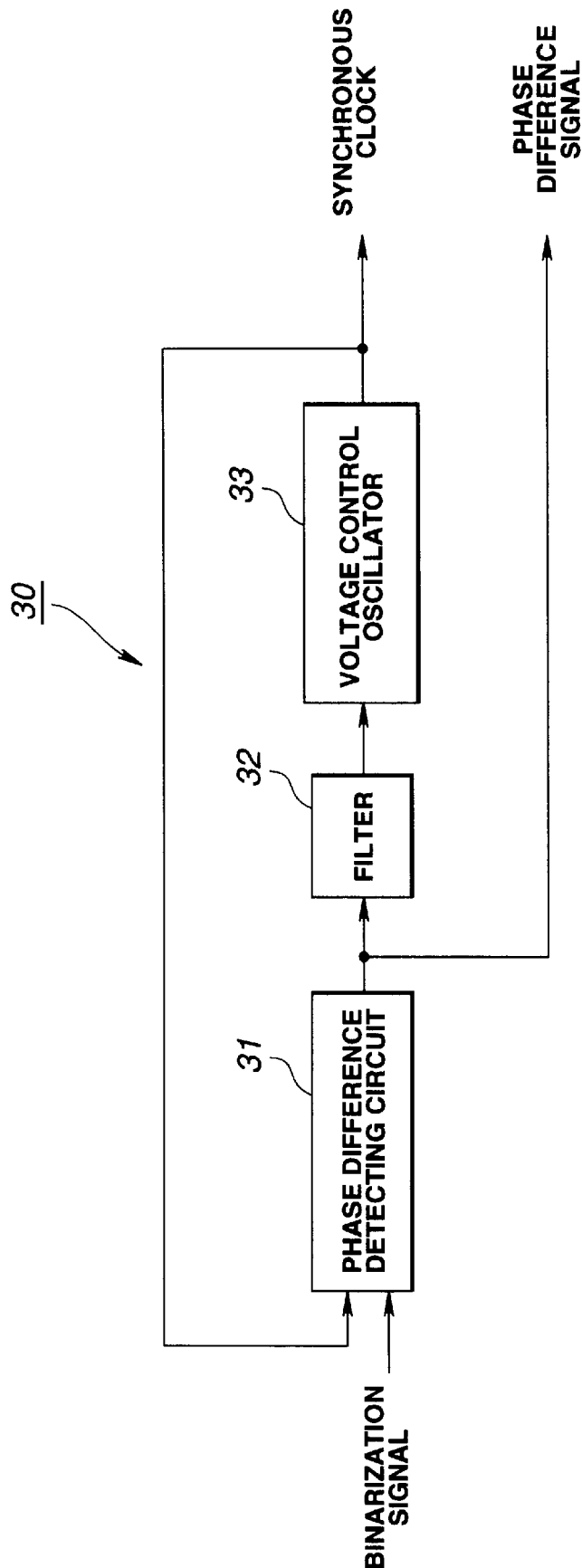
FIG. 2 is a block diagram showing a synchronous clock reproduction block of the digital signal reproduction circuit according to the present invention.

The synchronous clock reproduction block 30 is a means for generating a synchronous clock which is a synchronization signal of this binarization block 20 and is formed as a so-called PLL (phase locked loop) circuit. As shown in FIG. 2, this synchronous clock reproduction block 30 includes a phase difference detecting circuit 31, a filter 32, and a voltage control oscillator 33.

Figure 3:
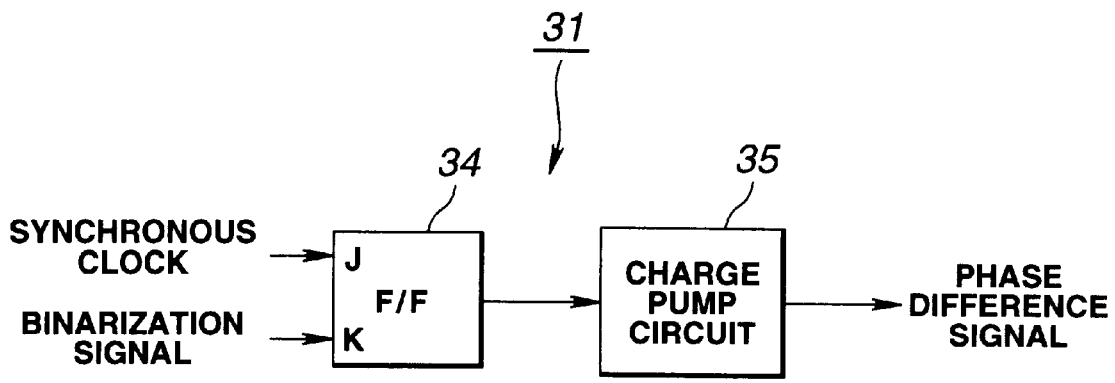
FIG. 3 is block diagram showing a phase difference detecting circuit in the digital signal reproduction circuit according to the present invention.
Figure 4:
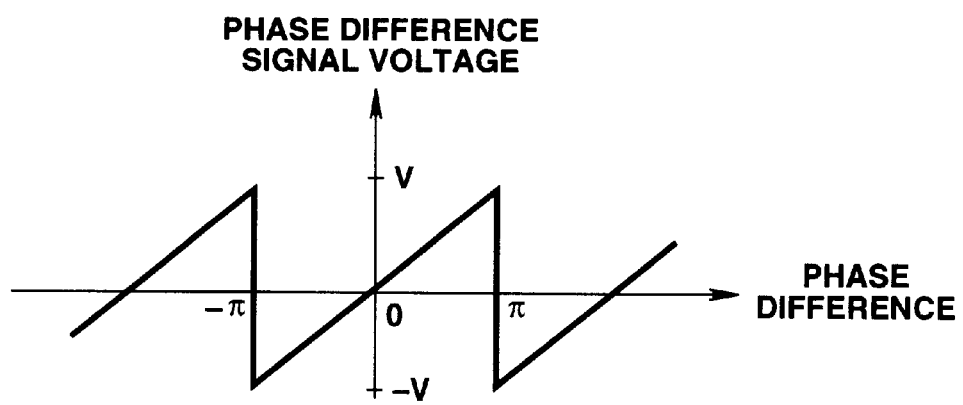
FIG. 4 shows a waveform of a voltage signal indicating a phase difference signal.

The phase difference detecting circuit 31 is supplied with the binary signal supplied from the binarization block 20 and the synchronous clock returned from the voltage control oscillator. The phase difference detecting circuit 31 outputs a phase difference between the binary signal and the synchronous clock as a phase difference signal of a voltage output. As shown in FIG. 3, the phase difference detecting circuit 31 can be formed by a flip-flop circuit 34 which operates according to the binary signal and the synchronous clock signal edge, and a charge pump circuit 35 which accumulates a charge at a timing from this flip-flop circuit 34 and outputs a sawtooth voltage signal according to a phase difference. This charge pump circuit 35 outputs a signal of a waveform as shown in FIG. 4. The output signal waveform shown in this FIG. 4 has a phase difference from $-\pi$ to $\pi$. The phase difference detecting circuit 31 may have a configuration other than the combination of the flip-flop circuit 34 and the charge pump circuit 35, if a voltage can be outputted according to a phase difference. The phase difference detecting circuit 31 outputs a phase difference signal which is supplied to the filter 32 and the waveform equalization control block 40.

The filter 32 averages the phase difference signal produced from the phase difference detecting circuit 31 and supplies the voltage control oscillator with a signal for the averaged offset.

The voltage control oscillator 33 is an oscillator which generates a synchronous clock to be synchronized with the aforementioned binary signal which is a digital signal and which is controlled by the averaged phase difference signal supplied from the filter 32. The voltage control oscillator 33 generates asynchronous clock of a frequency which makes the averaged phase difference signal 0 (zero). The synchronous clock generated by the voltage control oscillator 33 is returned to the phase difference detecting circuit 31.

The synchronous clock reproduction block 30, as has been described above, is provided with the phase difference detecting circuit 31, the filter 32, and the voltage control oscillator 33, so as to generate a synchronous clock and a phase difference signal. This synchronous clock is supplied to a decoding block or the like of the optical disk reproduction apparatus (not depicted) which carries out digital signal processing, whereas the phase difference signal is supplied to the waveform equalization control block 40.

Description will now be directed to the internal configuration of the aforementioned waveform equalization block 10 and a procedure for controlling the transfer function of the waveform equalization block 10 which is controlled by the waveform equalization control block 40. The waveform equalization control block 40 controls the transfer function of the waveform equalization block 10, so as to reduce the jitter component between the binary signal and the synchronous clock.

Figure 5:
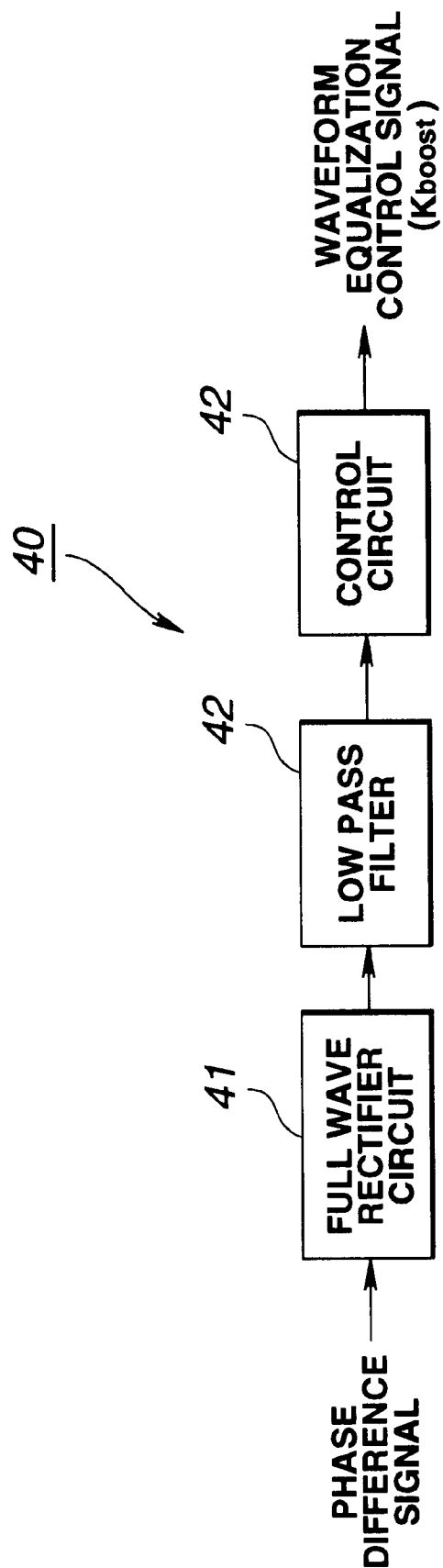
FIG. 5 is a block diagram of a waveform equalization control block in the digital signal reproduction circuit according to the present invention.

FIG. 5 shows the configuration of the waveform equalization control block 40 including: a full wave rectifier circuit 41 supplied with the phase difference signal from the synchronous clock reproduction block 30; a low pass filter 42; and a control circuit for controlling the transfer function of the waveform equalization block 10 by supplying a waveform equalization control signal ($K_{boost}$).

The full wave rectifier circuit 41 is supplied with the phase difference signal outputted from the synchronous clock reproduction block 30, and carries out a full wave rectification of this phase difference signal. This full wave rectification of the phase difference signal in the full wave rectifier circuit 41 is carried out for obtaining the jitter component between the binary signal and the synchronous clock, which jitter component appears as a dispersion of the phase difference signal. Consequently, this full wave rectifier circuit 41 may be any circuit capable of obtaining the phase difference dispersion, which circuit may be for obtaining a square of the phase difference signal instead of the full wave rectification of the phase difference signal. Alternatively, the circuit may be for obtaining a signal independently instead of using the phase difference signal supplied from the synchronous clock reproduction block 30. The phase difference signal which has been subjected to the full rectification in this full wave rectifier circuit 41 is supplied to the low pass filter 42.

The low pass filter 42 eliminates a component of a high band from the phase difference signal which has been full-wave rectified, thus averaging this signal. This averaged phase difference signal is the jitter component between the binary signal and the synchronous clock, which serves as a state evaluation signal for evaluating the state of the transfer function of the waveform equalization block 10. That is, if the waveform equalization by the waveform equalization block 10 is in a preferable state, the jitter component between the binary signal and the synchronous clock is reduced, which reduces the state evaluation signal which is the averaged phase difference signal outputted from the low pass filter 42. On the other hand, if the waveform equalization by the waveform equalization block 10 is not in a preferable state, the jitter component between the binary signal and the synchronous clock is increased, which in turn increases the state evaluation signal which is the averaged phase difference signal outputted from the low pass filter 42. The low pass filter 42 outputs the state evaluation signal of the waveform equalization block 10, which signal is supplied to the control circuit 43.

According to this state evaluation signal, the control circuit 43 obtains the value of the waveform equalization control signal and supplies this waveform equalization control signal so as to control the waveform equalization block 10. That is, the control circuit 43 determines a transfer function of the waveform equalization block 10 which makes the state evaluation signal have the lowest value and supplies the waveform equalization block 10 with a waveform equalization control signal corresponding to this transfer function so as to change the transfer function of the waveform equalization block 10. For this, the waveform equalization control signal supplied from the control circuit 43 to the waveform equalization block 10 differs depending on the filter of the waveform equalization block 10. This control circuit 43 can easily be realized by employing a microcomputer or the like.

Figure 6:
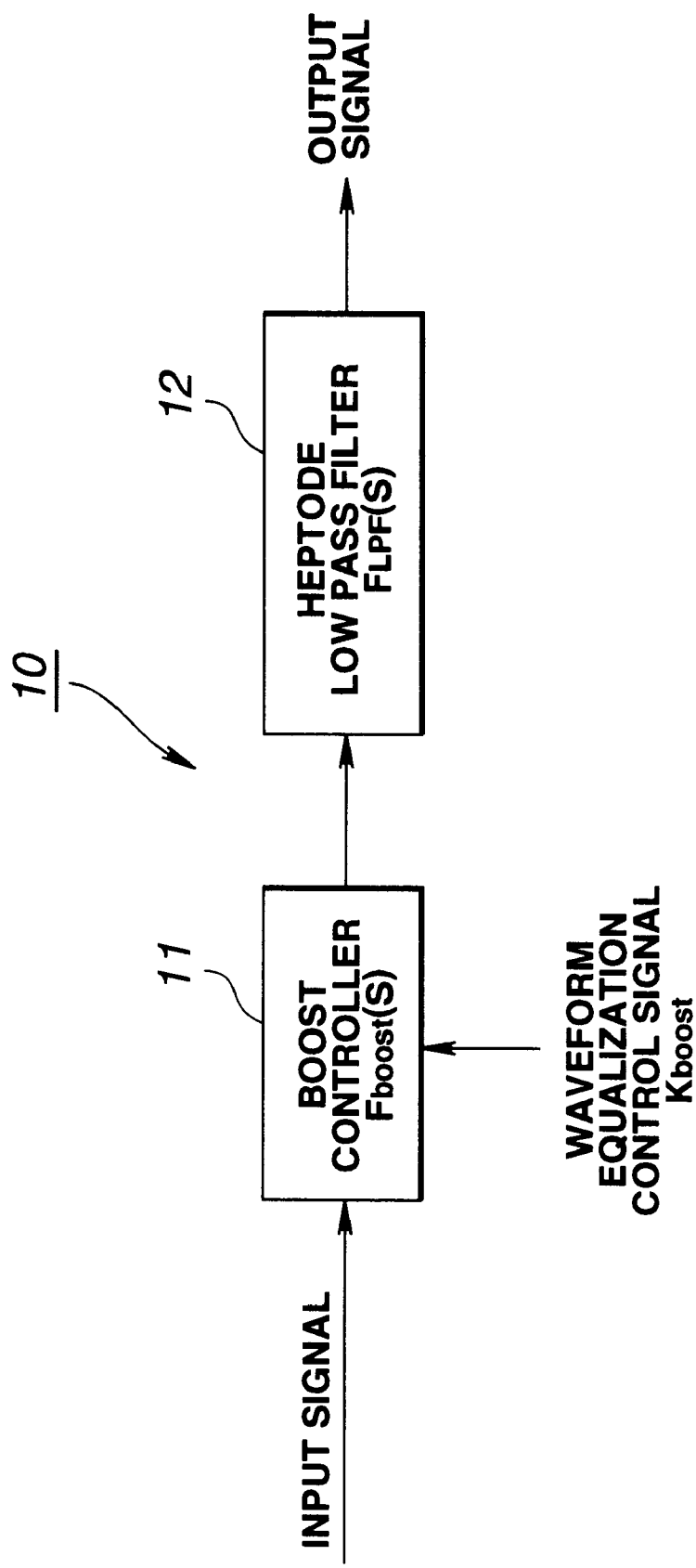
FIG. 6 is a block diagram showing a waveform equalization block in the digital signal reproduction circuit according to the present invention.

FIG. 6 shows the waveform equalization block 10 which is composed of a boost controller 11 and a heptode low pass filter 12.

The boost controller 11 is a circuit for boosting a predetermined frequency component with a boost ratio controlled by the waveform equalization control signal ($K_{boost}$) from the aforementioned control circuit 43. The boost controller 11 has a transfer function which is expressed in Equation 1 below.

[Equation 1]

$$F_{boost}(S) = 1 - K_{boost} \cdot S^2 \quad \text{[Equation 1]}$$

In this equation, S is an operator which has been normalized by a frequency $f_c$ and is expressed by Equation 2 below.

[Equation 2]

$$S \equiv \frac{s}{2\pi fc} = i \cdot \frac{f}{fc} \quad \text{[Equation 2]}$$

The heptode low pass filter 12 is a seven-dimensional low pass filter using a predetermined frequency $f_c$ as the shield frequency. This heptode low pass filter 12 has a transfer function expressed by Equation 3 below.

[Equation 3]

$$F_{LPF}(S) = \frac{a_0 \cdot b_0 \cdot c_0 \cdot d_0}{D(S)} \quad \text{[Equation 3]}$$

$$D(S) = (S^2 + a_1 \cdot S + a_0)(S^2 + b_1 \cdot S + b_0)(S^2 + c_1 \cdot S + c_0)(S + d_0)$$

Figure 7:
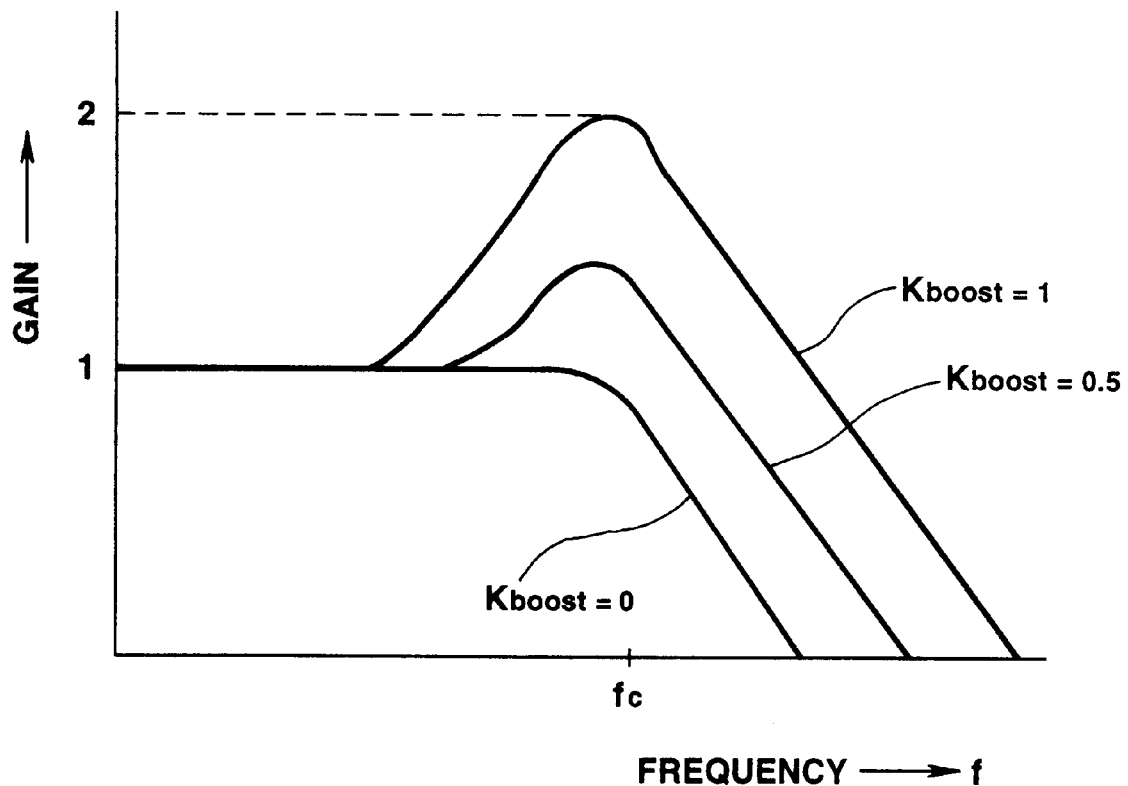
FIG. 7 shows frequency characteristics indicating an output signal characteristic of the waveform equalization block in the digital signal reproduction circuit according to the present invention.

FIG. 7 shows a transfer characteristic of the waveform equalization block 10 composed of the boost controller 11 and the heptode low pass filter, having the aforementioned transfer functions. In the graph of FIG. 7, the horizontal axis represents a frequency and the vertical axis represents a gain, and $f_c$ represents the shield frequency which may be, for example, the spatial shield frequency of the regenerative signal. As shown in this FIG. 7, when $K_{boost}=0$, the characteristic of the waveform equalization block 10 is not affected by the boost control 11 and exhibits the same characteristic as that of the heptode low pass filter 12. However, when $K_{boost}=1$, the gain is doubled at the frequency of $f_c$, i.e., the high band component is boosted.

Consequently, the high band component can be amplified by this waveform equalization block 10 with an amplification ratio or the like controlled by the waveform equalization control block 40 so as to reduce the jitter component between the binary signal and the synchronous clock, thus enabling to a desired waveform equalization to be carried out.

Figure 8:
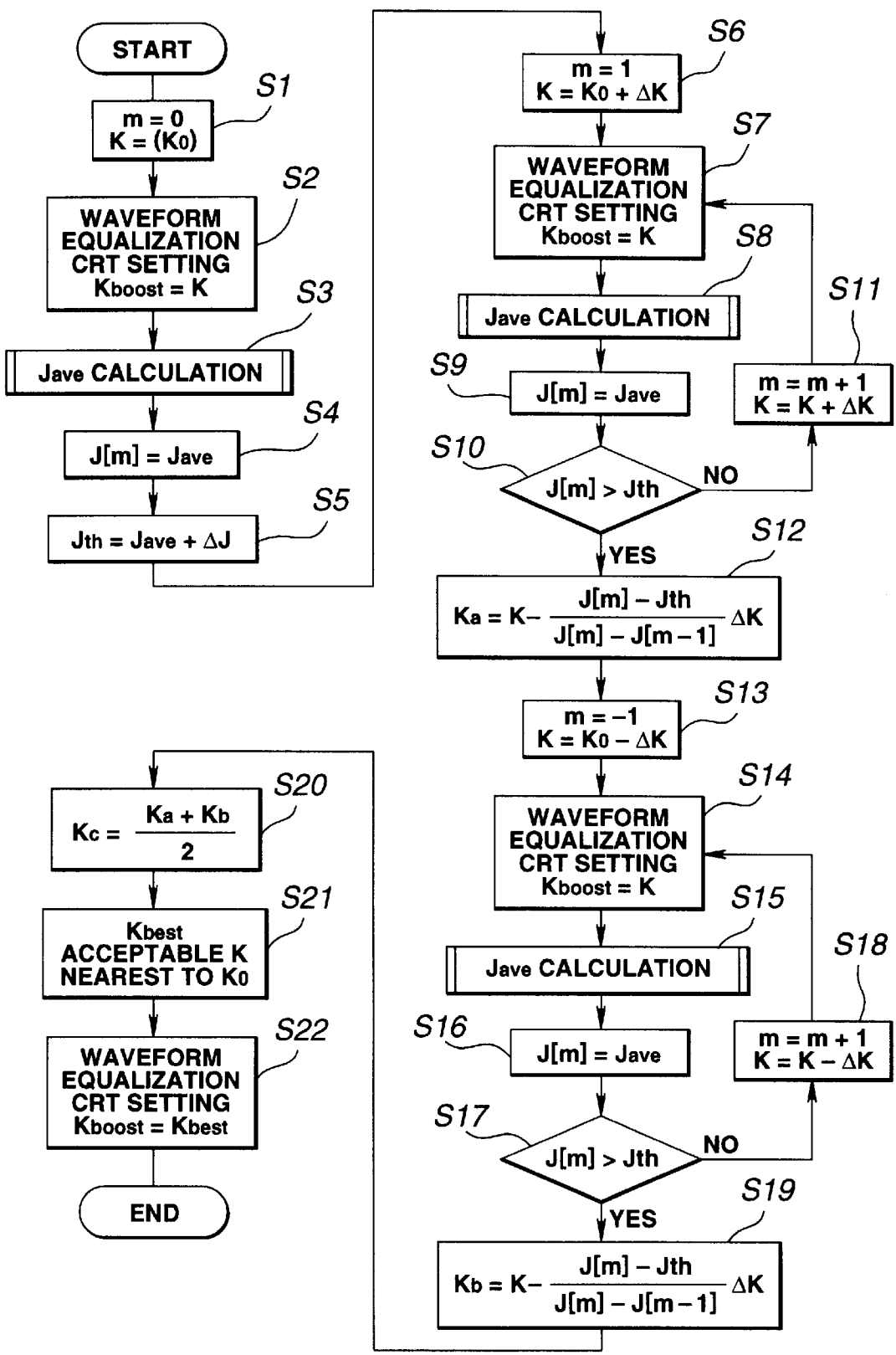
FIG. 8 is a flowchart showing a control procedure of a control circuit of the digital signal reproduction circuit according to the present invention.
Figure 9:
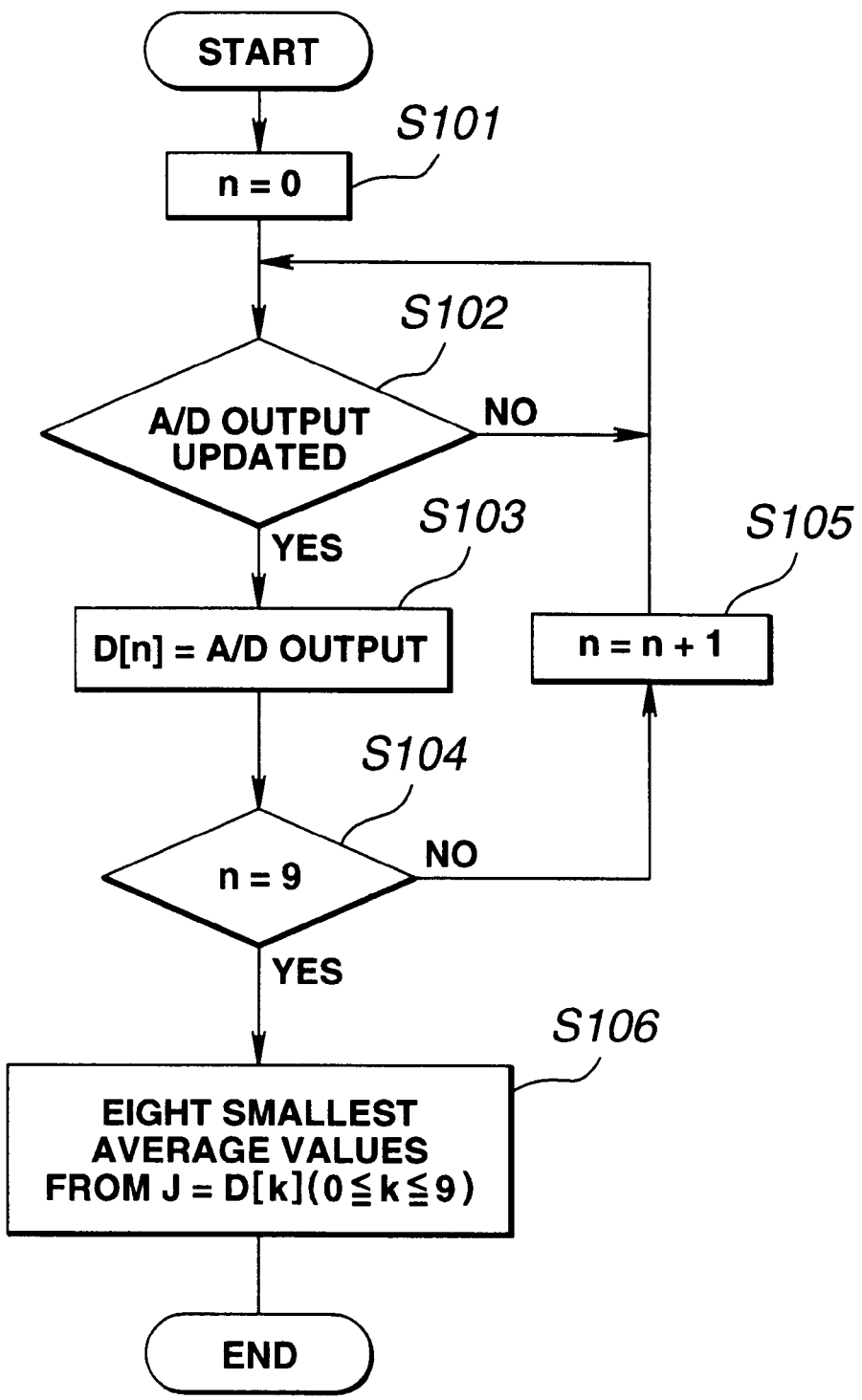
FIG. 9 is a flowchart showing a control procedure of the control circuit the digital signal reproduction circuit according to the present invention.
Figure 10:
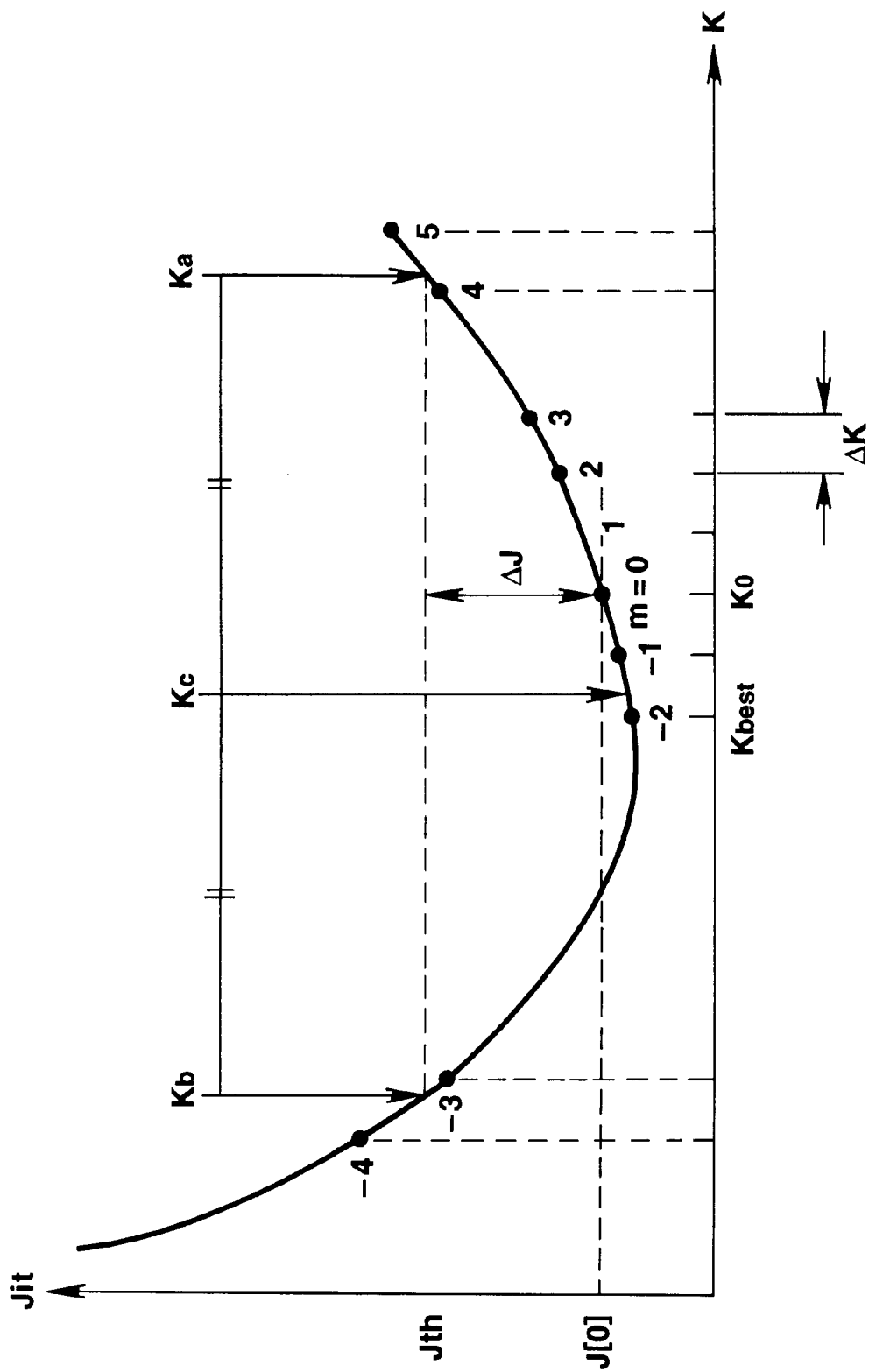
FIG. 10 explains a control procedure to obtain a control signal Kboost by the control circuit.

Description will now be directed to a detailed control procedure of the control circuit 43 with reference to flowcharts given in FIG. 8 and FIG. 9 and a graph of FIG. 10 showing the waveform equalization control signal ($K_{boost}$) and a level of the jitter component. This control by the control circuit 43 is carried out so as to determine a preferable waveform equalization control signal ($K_{boost}$) for controlling the transfer function of the waveform equalization block 10. Note that the control circuit 43 is assumed to be provided with an analog-to-digital converter for supplying a microcomputer used for carrying out control, with the state evaluation signal representing the jitter component which is an analog value.

The control circuit 43 starts a control in step S1 of FIG. 8 when a signal is reproduced from the optical disk 100 by the optical disk reproduction apparatus employing the digital signal reproduction circuit according to this first embodiment.

In step S1, the control circuit 43 sets a variable m to be m=0 and a variable K to be $K=K_0$. Here, $K_0$ is a value of the waveform equalization control signal ($K_{boost}$) which has been initialized. Control is passed from step S1 to step S2.

In step S2, the value of variable K is supplied as the waveform equalization control signal ($K_{boost}$) to the waveform equalization block 10 to change the characteristic of the transfer function of the waveform equalization block 10. Control is passed from step S2 to step S3.

Step S3 determines the value of the state evaluation signal (Jit) outputted from the low pass filter 42 which is changed by the change of the transfer function of the waveform equalization block 10. This state evaluation signal (Jit) is determined by sampling several times signals from the low pass filter 42 for obtaining the average value ($J_{ave}$).

FIG. 9 is a flowchart showing the procedure for calculating this average value.

When the calculation of the average value is started, in step S101, the variable n is set to n=0. Control is passed from step S101 to step S102.

In step S102, it is decided whether the output of the analog-to-digital converter provided in the control circuit 43 has been updated. This analog-to-digital converter serves to convert the state evaluation signal (Jit) of the low pass filter 42 from an analog value to a digital value for fetching a data. When the output of the analog-to-digital converter is updated, control is passed to step S103.

In step S103, this value of the analog-to-digital converter is assigned for the variable D[n]. Control is passed from step S103 to step S104.

In step S104, it is decided whether the variable n satisfies n=9. Unless n=9, control is passed to step S105, where n=n+1 is set and control is returned to step S102 to repeat the following procedure. If n=9 in step S104, control is passed to step S106.

Step S106 average the eight smallest values among the values of D[k] (k is an integer in the range of $0 \leq k \leq 9$) obtained in the processing from step S101 to S105, and assigns the obtained average value for the variable $J_{ave}$.

As has been described above, in steps S101 to S106, an average value $J_{ave}$ of eight samples of the state evaluation signals (Jit) is determined when a predetermined waveform equalization control signal ($K_{boost}$) is set. It should be noted that two samples having the greatest two values are deleted in step S106 because they are considered to be abnormal values which may have been caused, for example, by a scar on the recording medium.

In step S3, the average value $J_{ave}$ of the state evaluation signal (Jit) is obtained by the procedure executed in the aforementioned steps S101 to S106, and control is passed to step S4.

In steps 4, the $J_{ave}$ obtained in step S3 is assigned for the variable J[m] ($J_{ave}$=J[m]), and control is passed to step S5.

In step S5, the $J_{ave}$ obtained in step S3 is added by a constant $\Delta J$ so as to obtain a threshold value Jth (Jth=$J_{ave}$+$\Delta J$). This constant $\Delta J$ is a predetermined value. Control is passed from step S5 to S6.

In step S6, the variable m is set to m=1, and the variable K is set to K=$K_0$+$\Delta K$. Here, the $\Delta K$ represents a step width when the waveform equalization control signal ($K_{boost}$) is changed and supplied to the waveform equalization block 10. This value is a predetermined value. Control is passed from S6 to step S7.

In step S7, the value of the variable K is supplied as the waveform equalization control signal ($K_{boost}$) to the waveform equalization block 10, so as to change the characteristic of the transfer function of the waveform equalization block 10. Control is passed from step S6 to step S8.

In step S8, the average value $J_{ave}$ of the state evaluation signal (Jit) is obtained in the same way as in step S3 using the subroutine of S101 to S106, and control is passed to step S9.

In step S9, the $J_{ave}$ is assigned for the variable J[m], and control is passed to step S10.

In step S10, it is decided whether J[m] exceeds the threshold value Jth determined in step S5. Unless J[m] exceeds Jth, control is passed to step 11, where the variable m and the variable K are set to m=m+1 and K=K+ΔK, respectively, and the processing of step 7 to step 11 is repeated. If J[m] exceeds Jth, control is passed to step S12.

In step S 12, $K_a$ is obtained from Equation 4 below.
[Equation 4]

$$K_a = K - \frac{J[m] - Jth}{J[m] - J[m-1]} \Delta K \qquad \text{[Equation 4]}$$

This $K_a$ is an approximate value of the waveform equalization control signal corresponding to the threshold value Jth. Control is passed from step S12 to S13.

In step S13, the variable m is set to m=−1, and the variable K is set to K=$K_0$−ΔK. Control is passed from step S13 to step S14.

In step S14, the value of the variable K is supplied as the waveform equalization control signal ($K_{boost}$) to the waveform equalization block 10 so as to modify the characteristic of the transfer function of the waveform equalization block 10. Control is passed from step S14 to step S15.

In step S15, the average value $J_{ave}$ of the state evaluation signal (Jit) is obtained in the same way as in step S3 using the subroutine of steps S101 to step S106, and control is passed to step S16.

In step S16, $J_{ave}$ is assigned for the variable J[m], and control is passed to step S17.

In step S17, it is decided whether the J[m] exceeds the threshold value Jth obtained in step S5. Unless J[m] exceeds Jth, control is passed to S18, where the variable m and variable K are set to m=m−1 and K=K−ΔK, respectively, and the processing of steps S14 to S17 is repeated. If J[m] is found to exceed Jth, control is passed to step S19.

In step 19, $K_b$ is obtained by Equation 5 below.
[Equation 5]

$$K_b = K - \frac{J[m] - Jth}{J[m] - J[m-1]} \Delta K \qquad \text{[Equation 5]}$$

This Kb is obtained, and control is passed from step S19 to step S20.

In step S20, as shown in FIG. 10, the value of the middle point $K_c$ between $K_a$ and $K_b$ is obtained, and control is passed to step S21.

In step S21, as shown in FIG. 10, a value of K which can be set and is nearest to Kc is specified as $K_{best}$. That is, the values of the waveform equalization control signal ($K_{boost}$) which can be supplied to the waveform equalization block 10 are discrete values of ΔK step. It should be noted that the $K_{boost}$ may have a smaller step than ΔK step. Control is passed from step S21 to S22.

In step S22, the value of $K_{boost}$ obtained in step S21 is supplied as the waveform equalization control signal ($K_{boost}$) to the waveform equalization block 10, thus completing the control.

Thus, by executing the aforementioned control, the control circuit 43 can obtain a preferable waveform equalization control signal ($K_{boost}$) so as to control the transfer function of the waveform equalization block 10.

Note that the control by this control circuit 43 is executed when a reproduction of the optical disk 100, i.e., a recording medium is started. It is also possible that the control is repeated for every predetermined period of time while the optical disk reproduction apparatus is reproducing a signal. The predetermined period of time does not have any particular value specified.

As has thus far been described, in the digital signal reproduction circuit 1 according to the first embodiment of the present invention, the transfer function of the waveform equalization block 10 is changed according to a result of detection of a phase difference signal, so as to compensate a change of signal characteristics caused by characteristics changes of the optical pickup by age or a temperature change as well as irregularities of the recording medium, thus enabling the reproduction system to obtain a desired characteristic of the waveform equalization. Moreover, in a conventional optical disk reproduction apparatus which requires a phase difference detecting circuit for reproducing a synchronous clock, the digital signal reproduction circuit 1 can be realized only by adding the waveform equalization control block 40. That is, almost no cost increase is involved in implementing the present invention in practice.

Description will now be directed to a digital signal reproduction circuit according to a second embodiment of the present invention. Note that in the explanation of the digital signal reproduction circuit according to the second embodiment, like components as the digital signal reproduction circuit of the first embodiment are denoted by like symbols in the drawings and their explanations will not be given in detail. The same applies to a third embodiment which will be explained later.

Figure 11:
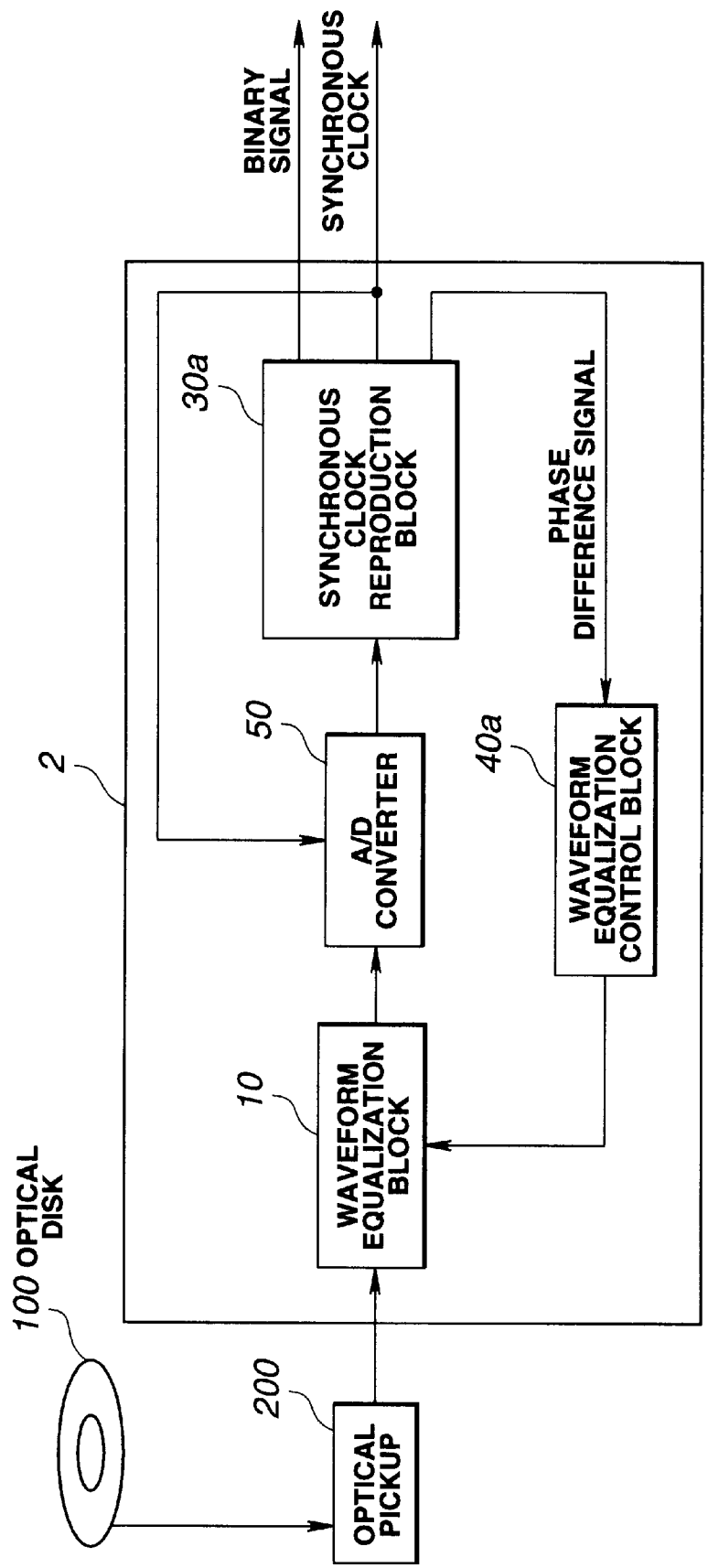
FIG. 11 is a block diagram showing a digital signal reproduction circuit according to a second embodiment of the present invention.

FIG. 11 shows the configuration of the digital signal reproduction circuit 2 according to the second embodiment including: a waveform equalization block 10 for waveform-equalizing a regenerative signal from an optical pickup 200; an A/D converter 50 for converting into a digital data the regenerative signal which has been waveform-equalized; a synchronous clock reproduction block 30a for generating a binary signal and a synchronous clock from the regenerative signal which has been converted into the digital data; and a waveform equalizing control block 40a for controlling a transfer function of the waveform equalization block 10 according to a jitter component between the synchronous clock and the binary signal.

In this digital signal reproduction circuit 2 according to the second embodiment, the synchronous clock reproduction block 30a generates a binary signal and a synchronous signal by using digital processing so that the transfer function of the waveform equalization block 10 is controlled so as to reduce a jitter component between the binary signal and the synchronous clock which are outputted from the synchronous clock reproduction block 30a. Thus, the quality of the reproduced data is maintained.

The waveform equalization block 10 waveform-equalizes a regenerative signal supplied from the optical pickup 200. The waveform equalization block 10 has a transfer function which is controlled by the waveform equalization control block 40a so as to reduce a jitter component between the binary signal and the synchronous clock. The regenerative signal which has been waveform-equalized by the waveform equalization block 10 is supplied to the A/D converter 50.

The A/D converter converts into digital data the waveform-equalized regenerative signal which is an analog signal. The A/D converter uses as a sampling clock the synchronous clock of the synchronous clock reproduction block 30a. For example, in a case of a digital video disk, it is specified that data is recorded on a recording medium at a cycle of 3T to 11T (wherein T is assumed to be a cycle of the synchronous clock). Consequently, the productivity is guaranteed even if the sampling clock of the A/D converter is the frequency of the synchronous clock. The regenerative signal which has been converted into a digital data by the A/D converter 50 is supplied to the synchronous clock reproduction block 30*a*.

The synchronous clock reproduction block 30*a* is a means for generating a binary signal of a regenerative signal and a synchronous clock of this binary signal.

Figure 12:
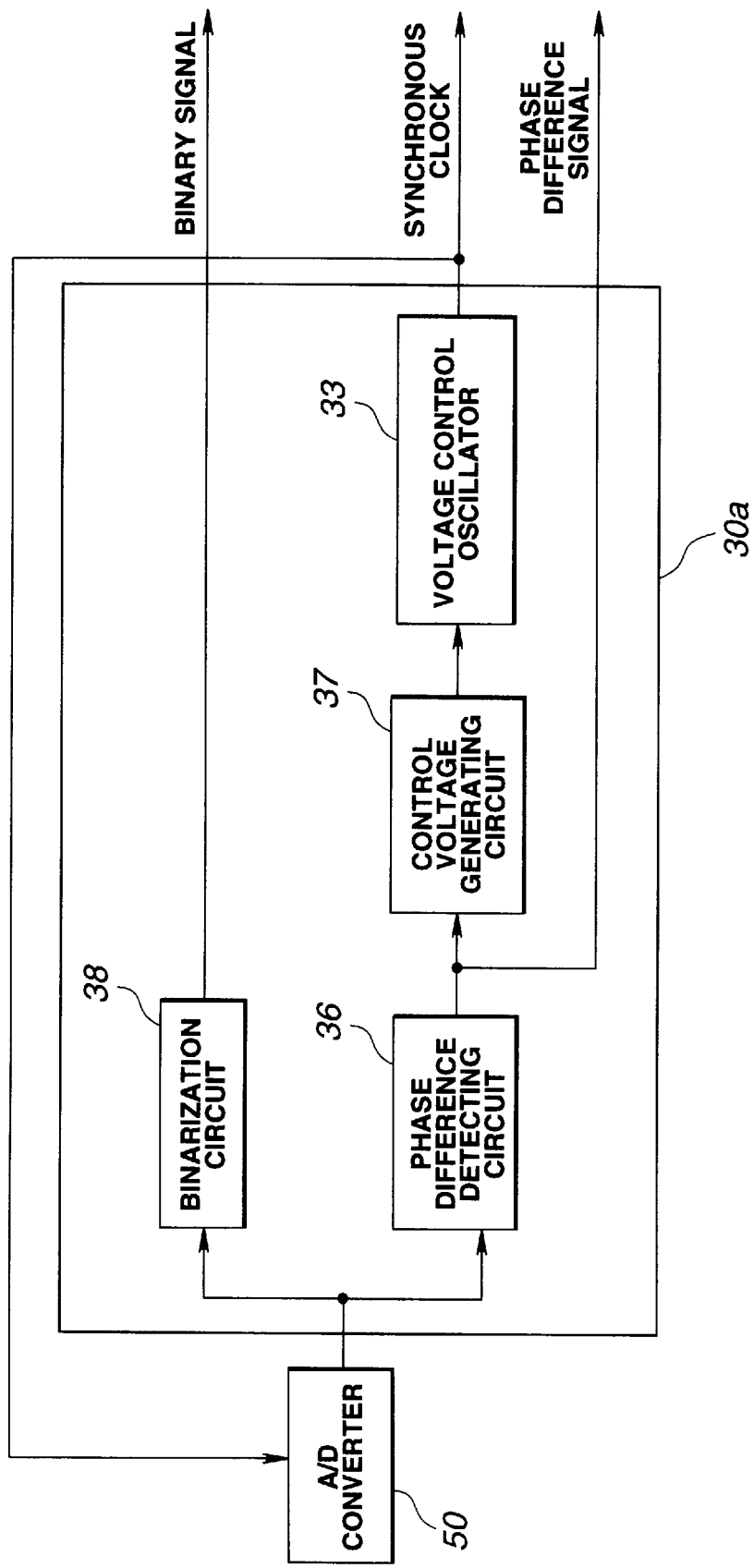
FIG. 12 is a block diagram showing a synchronous clock reproduction block of the digital signal reproduction circuit according to the present invention.

As shown in FIG. 12, the synchronous clock reproduction block 30*a* includes a phase difference detecting circuit 36, a control voltage generating circuit 37, a voltage control oscillator 33, and a binarization circuit 38.

The binarization circuit 38 compares the regenerative signal outputted as a digital signal from the A/D converter, with a predetermined threshold value for generating a binary signal. Because the binarization circuit 38 has a threshold value o, binarization can be carried out according to a change of the sign of the digital data.

The phase difference detecting circuit 36 is supplied with the digital data from the A/D converter 50. According to this digital data, the phase difference detecting circuit 36 detects a phase difference between the regenerative signal which has been waveform-equalized and the synchronous clock. In this synchronous clock reproduction block 30*a* which employs the sampling frequency of the A/D converter 50 as the frequency of the synchronous clock, instead of detecting a phase difference by directly returning the binary signal, it is possible to detect a phase difference between the synchronous clock and the digital output from this A/D converter 50.

Figure 13D:
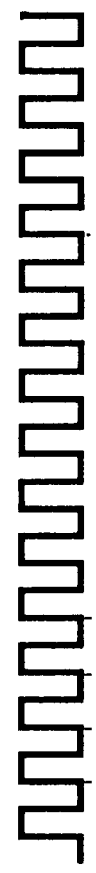
FIG. 13 explains a phase difference detecting procedure by a phase difference detecting circuit of the digital signal reproduction circuit according to the present invention.
Figure 13D:
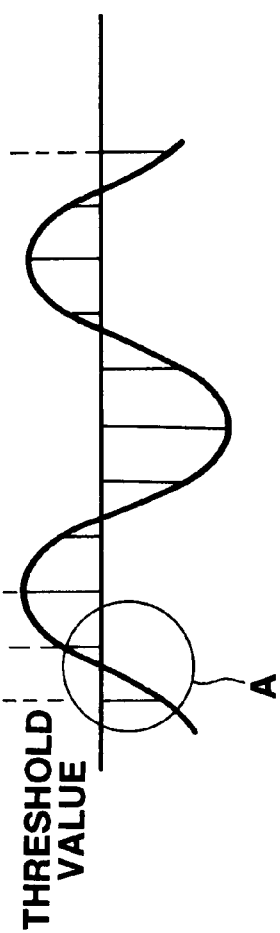
Figure 13D:
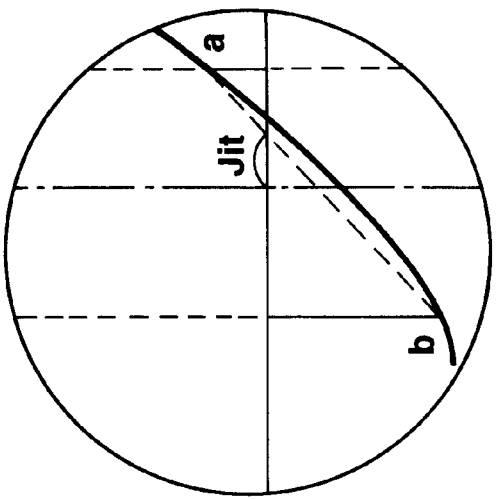

FIG. 13 explains a method for detecting the phase difference by this phase difference detecting circuit 36. As shown in FIG. 13A, the A/D converter 50 is supplied with the synchronous clock from the voltage control oscillator as a sampling clock. Here, it is assumed that the A/D converter 50 is supplied with the regenerative signal from the recording medium in which a bit of 3T cycle is formed. The signal of 3T cycle supplied to the A/D converter 50 has a waveform as shown in FIG. 13C. The A/D converter 50 holds this signal of 3T cycle, for example, at the rising edge of the sampling clock and converts it into digital data.

The phase difference detecting circuit 36 detects the moment (hereinafter, referred to as a change point) when the threshold value is exceeded by the regenerative signal supplied. In this embodiment, the threshold value is set to 0 volt, and, as shown in FIG. 13C, the change point is found between two samples having different signs. The portion A indicated in FIG. 13C is enlarged into FIG. 13D. Because a change of a successive regenerative signal is almost a direct line in the vicinity of the change point, the change point can be determined by obtaining a ratio of two successive digital data (a and b in this case) which sandwich the change point. From this change point, the phase difference detecting circuit 36 determines the phase difference with the sampling clock indicated by Jit in FIG. 13D. Thus, the phase difference detecting circuit 36 can detect a phase difference with the synchronous clock from the digital output from the A/D converter 50.

The phase difference signal obtained by this phase difference detecting circuit 36 is supplied to the control voltage generating circuit 37. The phase difference signal is also supplied to the waveform equalization control block 40*a*.

The control voltage generating circuit 37 converts into an analog voltage output the phase difference signal supplied as digital data from the phase difference detecting circuit 36, and supplies the analog voltage output to the voltage control oscillator 33. Here, a digital low pass filter or an analog low pass filter is used for averaging for supply to the phase difference detecting circuit 36.

Such a configuration of the synchronous clock reproduction block 30*a* is disclosed, for example, in Japanese Patent Laid-Open Hei 8-154053.

The voltage control oscillator 33 generates such a synchronous clock that will make the averaged phase difference signal 0 (zero).

In the same way as the aforementioned first embodiment, the waveform equalization control block 40*a* controls the transfer function of the waveform equalization block 10 so as to reduce the jitter component between the binary signal and the synchronous signal. The waveform equalization control block 40*a* supplies $K_{boost}$ as a control signal to the waveform equalization block 10. Unlike the waveform equalization control block 40 of the first embodiment, the waveform equalization control block 40*a* is supplied with a phase difference signal as digital data and accordingly, includes a full wave rectifier circuit 41 and a low pass filter 42, each of which is a circuit for carrying out digital processing. Moreover, the control circuit 43 need not be provided with an analog-to-digital converter for fetching the state evaluation signal to the microcomputer.

As has thus far been described, in the digital signal generating circuit 2 according to the second embodiment of the present invention, the transfer function of the waveform equalization block 10 is changed according to a result of detection of the phase difference signal, so as to compensate a change of signal characteristics caused by characteristics change of the optical pickup by age or a temperature change as well as irregularities of the recording medium, thus enabling the reproduction system to obtain a desired waveform equalization characteristic. Moreover, the synchronous clock reproduction block 30*a* can obtain a phase difference signal by means of digital data processing. Furthermore, in a conventional optical disc reproduction apparatus which requires a phase difference detecting circuit for reproducing a synchronous clock, the digital signal reproduction circuit 2 can be realized only by adding the waveform equalization control block 40*a*, i.e., with minimal additional cost.

Description will now be directed to a digital signal reproduction circuit according to a third embodiment of the present invention.

Figure 14:
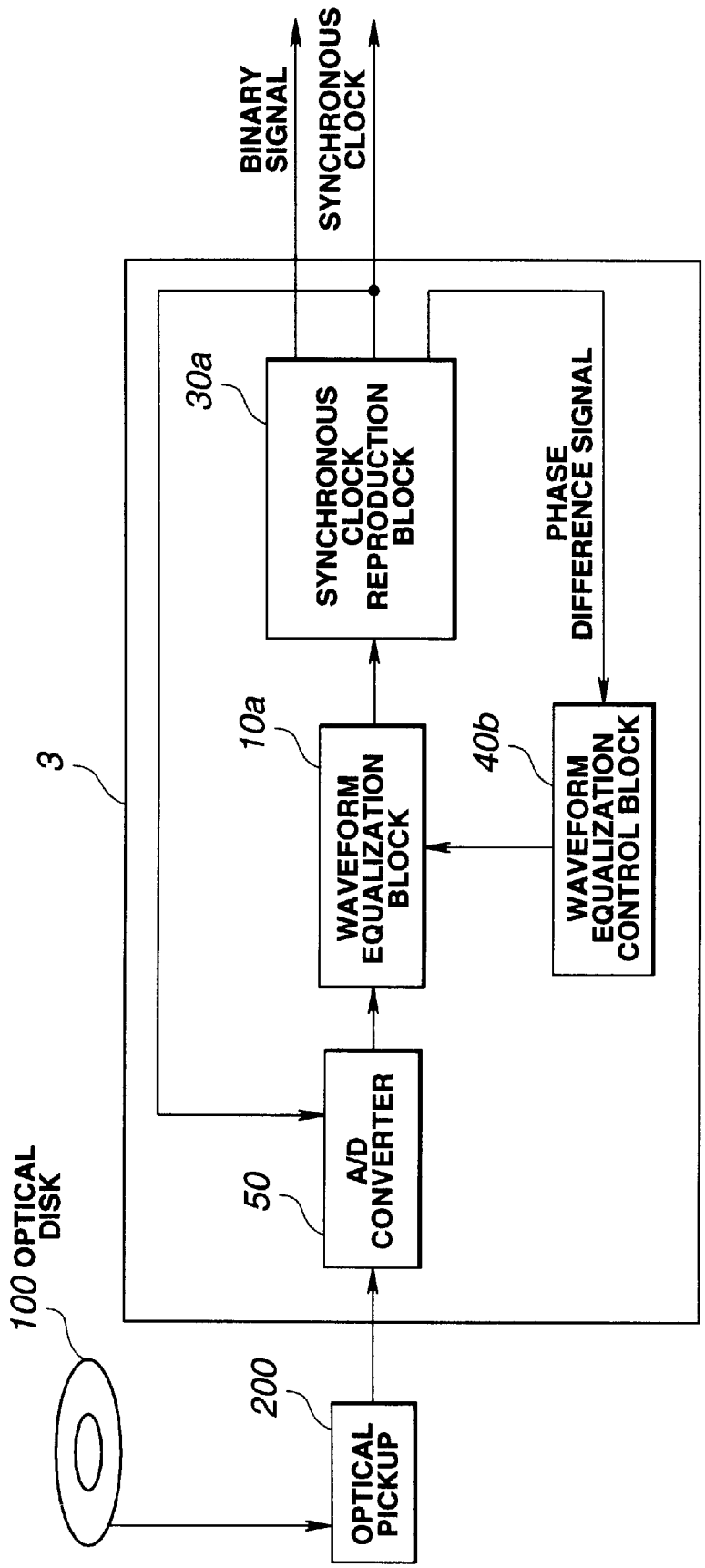
FIG. 14 is a block diagram showing a digital signal reproduction circuit according to a third embodiment of the present invention.

FIG. 14 shows the digital signal reproduction circuit 3 according to the third embodiment including: an A/D converter 50 for converting into digital data a regenerative signal from an optical pickup 200; a waveform equalization block 10*a* for waveform-equalizing the regenerative signal which has been converted into a digital data; a synchronous clock reproduction block 30*a* for generating a binary signal and a synchronous signal from the digital regenerative signal which has been waveform-equalized; and a waveform equalization control block 40*b* for controlling a transfer function of the waveform equalization block 10 according to a jitter component between the synchronous clock and the binary signal.

In this digital signal reproduction circuit 3 according to the third embodiment, the regenerative signal from the optical pickup 200 is subjected to analog-to-digital conversion before waveform equalization is carried out. Consequently, the waveform equalization block 10 carries out digital processing of the regenerative signal. The transfer function of the waveform equalization block 10*a* is controlled so as to reduce the jitter component between the synchronous clock and the binary signal outputted from the synchronous clock reproduction block 30*a*, thus maintaining the quality of the reproduced data.

The A/D converter 50 converts into a digital data the regenerative signal from the optical pickup and supplies the digital data to the waveform equalization block 10a. This A/D converter uses the synchronous clock returned from the synchronous clock reproduction block 30a.

The waveform equalization block 10a waveform-equalizes the regenerative signal supplied as a digital data from the A/D converter 50. The waveform equalization block 10a is formed as a filter circuit having a predetermined transfer function, which is controlled by the waveform equalization control block 40b so as to reduce the jitter component between the binary signal and the synchronous clock.

Figure 15:
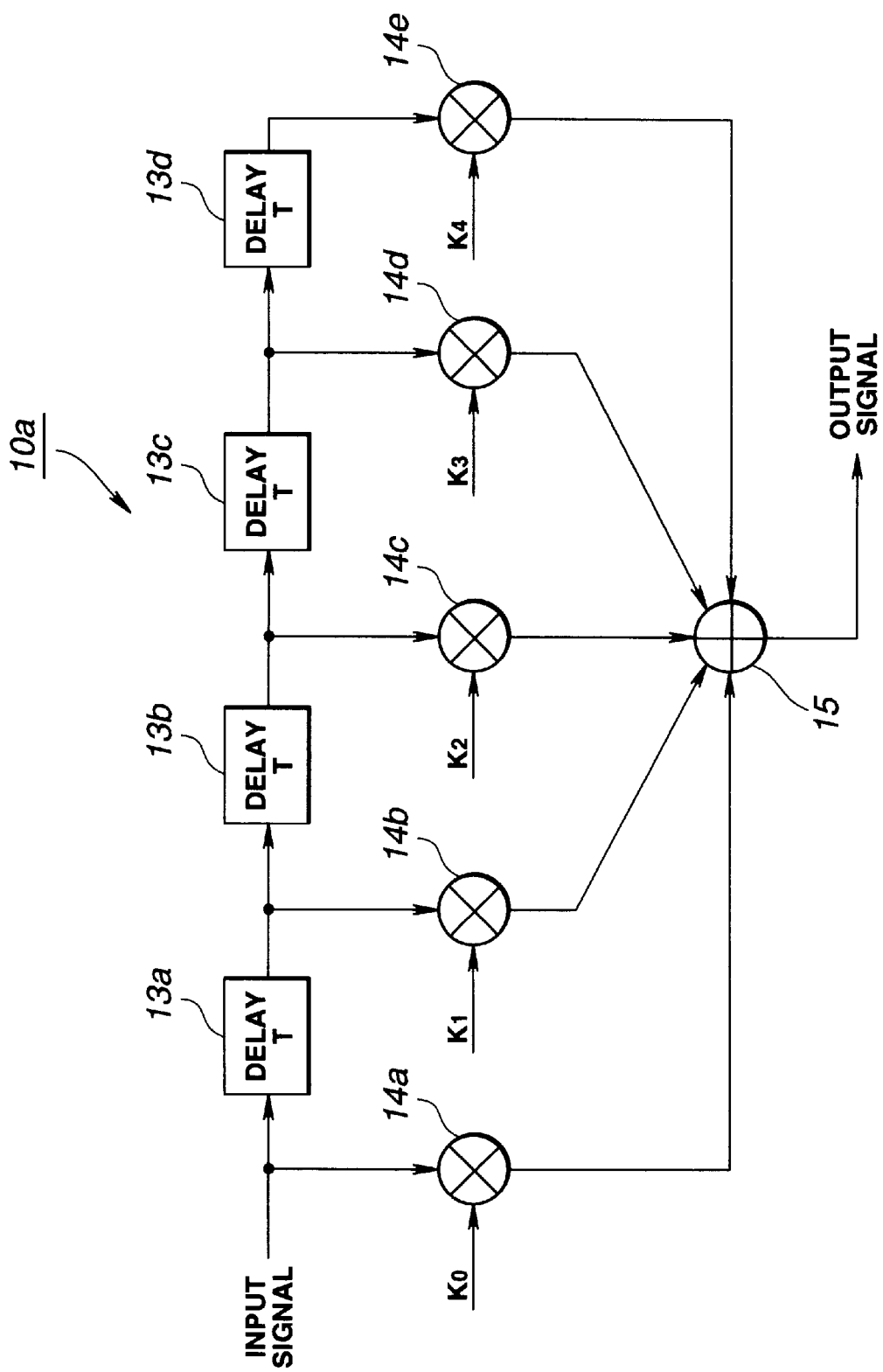
FIG. 15 is a block diagram showing a waveform equalization block of the digital signal reproduction circuit according to the present invention.

As shown in FIG. 15, for example, the waveform equalization block 10a is realized as a filter including a delay circuit 13, a multiplier 14, and an adder 15. The delay circuit 13 has four stages from 13a to 13d with a delay constant T which is equal to the synchronous clock multiplied by an integer. The multiplier 14 multiplies with a predetermined constant K the input signal and the outputs from the delay circuits 13a to 13d. Outputs from the multipliers 14a to 14d are added by the adder 15, and the result is outputted.

The waveform equalization control block 14b controls this transfer function so as to reduce the jitter component between the binary signal and the synchronous clock. The aforementioned waveform equalization block 10a changes its transfer function according to the constant T and $K_0$ to $K_4$. For this, the waveform equalization control block 40 determines a preferable transfer function so as to vary these constants T and $K_0$ to $K_4$, thus controlling the waveform equalization block 10a. It can be said that a control using a plurality of variables is complicated. It is possible to simplify the control, for example, by fixing the delay constant T of the delay circuit 13 and the multiplier K2 of the multiplier 14c to particular values and by setting the multipliers K0, K1, K3, and K4 of the multipliers 14a, 14b, 14d, and 14e at an identical value.

The regenerative signal which has been waveform-equalized and outputted from the waveform equalization block 10a is supplied to the synchronous clock reproduction block 30a. The synchronous clock reproduction block 30a outputs from this regenerative signal, a binary signal, a synchronous clock, and a phase difference signal.

As has thus far been described, in the digital signal reproduction circuit 3 according to the third embodiment of the present invention, a regenerative signal from the optical pickup 200 is converted into digital data by the A/D converter 50 so that the waveform equalization block 10a can carry out the waveform equalization by a digital processing. Moreover, the transfer function of the waveform equalization block 10a is varied according to a result of a detection of the phase difference signal so as to compensate a change of signal characteristics caused by characteristics changes of the optical pickup by age or a temperature change as well as irregularities of the recording medium, thus enabling a desired waveform equalization characteristic to be obtained. Furthermore, in a conventional optical disk reproduction apparatus which requires a phase difference detecting circuit for reproducing a synchronous clock, the digital signal reproduction circuit 3 can be realized only by adding the waveform equalization control block 40b with the least cost increase.

Description will now be directed to a digital signal reproduction circuit according to a fourth embodiment of the present invention.

Figure 16:
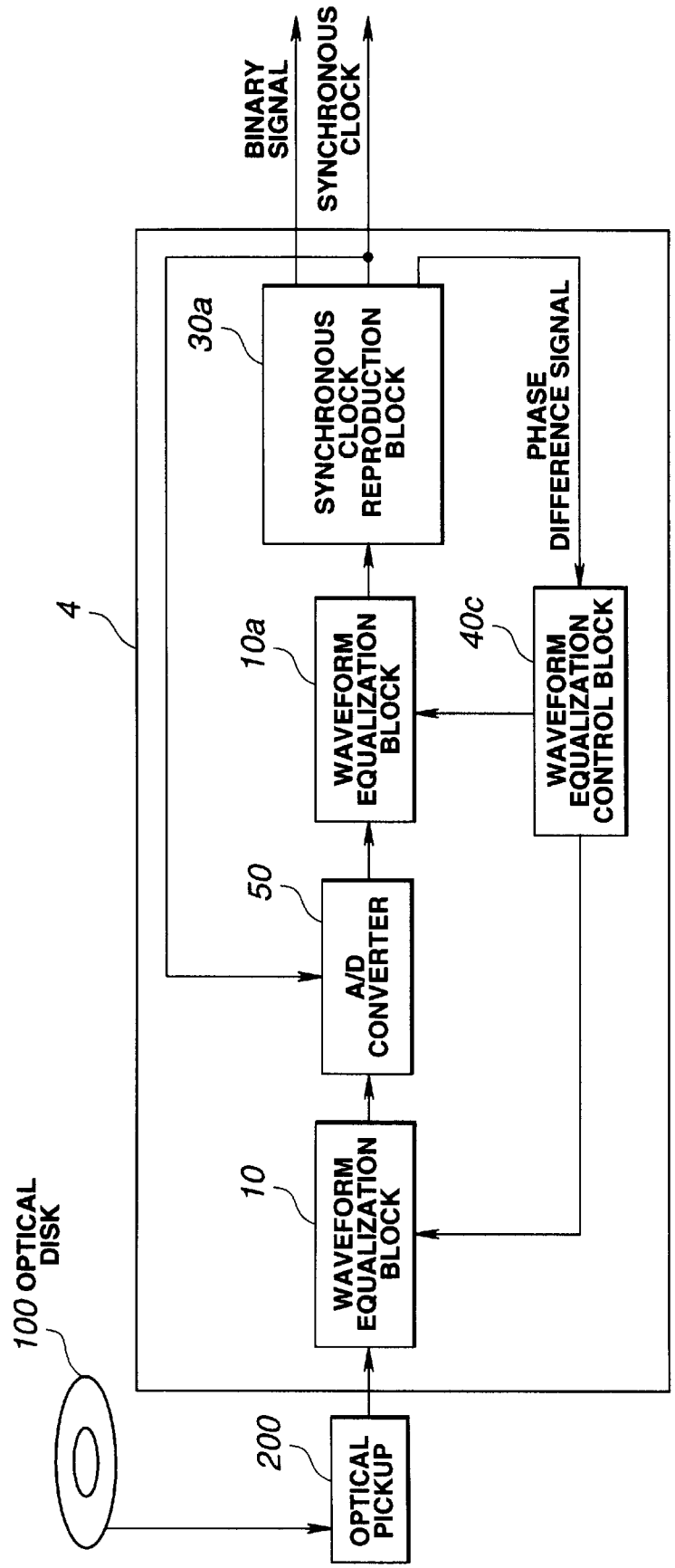
FIG. 16 is a block diagram showing a digital signal reproduction circuit according to a fourth embodiment of the present invention.

FIG. 16 is a block diagram showing the digital signal reproduction circuit 4 according to the fourth embodiment including: a waveform equalization block 10 for waveform-equalizing a regenerative signal from an optical pickup 200; an A/D converter for converting into a digital data the regenerative signal which has been waveform-equalized by the waveform equalization block 10; a waveform equalization block 10a for further waveform-equalizing the regenerative signal which has been converted into a digital data; a synchronous clock reproduction block 30a for generating a binary signal and a synchronous signal from the regenerative signal which has been waveform-equalized; and a waveform equalization control block 40c for controlling transfer functions of the waveform equalization block 10 and the waveform equalization block 10a.

The digital signal reproduction circuit 4 according to the fourth embodiment has two waveform equalization blocks: the waveform equalization block 10 and the waveform equalization block 10a. The waveform equalization control block 40c controls the transfer function of the waveform equalization block 10 and the transfer function of the waveform equalization block 10a so as to reduce a jitter component between the binary signal and the synchronous clock outputted from the synchronous clock reproduction block 30a, thus maintaining the quality of a data reproduced.

The waveform equalization block 10 carries out a waveform equalization of the regenerative signal which is an analog signal, in the same way as in the first embodiment, whereas the waveform equalization block 10a carries out a waveform equalization of the regenerative signal which is a digital data, in the same way as in the third embodiment.

The waveform equalization block 40c controls the transfer functions of the two waveform equalization blocks i.e., the waveform equalization block 10 and the waveform equalization block 10a. In this control, for example, it is possible to carry out a rough waveform-equalization in the waveform equalization block 10 and a precision adjustment in the waveform equalization block 10a. Moreover, according to the transfer functions of the waveform equalization blocks 10 and 10a, it is possible that the waveform equalization block 10a carries out waveform equalization of a frequency band which cannot be carried out by the waveform equalization block 10 and that the waveform equalization block 10 carries waveform equalization of another frequency band which cannot be carried out by the waveform equalization block 10a.

As has been described above, in the digital signal reproduction circuit 4 according to the fourth embodiment of the present invention including two waveform equalization blocks 10 and 10a, it is possible to obtain a high accuracy of the waveform equalization characteristics. Moreover, the transfer functions of the waveform equalization blocks 10 and 10a are varied according to a result of a detection of the phase difference signal so as to compensate a change of signal characteristics caused by characteristics changes of the optical pickup by age or a temperature change as well as irregularities of the recording medium, thus enabling to obtain a preferable waveform equalization characteristic. Furthermore, in a conventional optical disk reproduction apparatus which requires a phase difference detecting circuit for reproducing a synchronous clock, the digital signal reproduction circuit 4 can be realized only by adding the waveform equalization control block 40c with the least cost increase.

The waveform equalization block of the digital signal reproduction circuit according to the present invention is not limited to the aforementioned first to the fourth embodiments, but it can be other than the first to the fourth embodiments if it can change its transfer function according to an external signal.

Moreover, the digital signal reproduction circuit according to the present invention can be applied not only to an optical disk reproduction apparatus but also, for example, to a reproduction apparatus for reproducing a digital information transferred via other recording medium or other transfer medium.

In the digital signal reproduction circuit according to the present invention, a phase difference between a digital signal outputted and a synchronous clock of this digital signal is returned to phase difference equalization means, and a transfer function of the waveform equalization means is varied so as to reduce the aforementioned phase difference, enabling to obtain an optimal waveform equalization characteristic. The waveform equalization characteristic is automatically varied, which enables to compensate a change of signal characteristics caused by characteristics changes of an optical pickup by age or a temperature change as well as irregularities of a recording medium and to obtain a optimal waveform equalization characteristic.

Moreover, in the digital signal reproduction circuit according to the present invention, a synchronous clock generated is returned as a sampling clock to analog-to-digital converting means, so as to detect a phase difference between a transfer signal which has been waveform-equalized and the aforementioned synchronous clock. The waveform equalization means has a transfer function which is varied so as to reduce the aforementioned phase difference. This reduces an interference between signs of the digital information transferred by a digital signal, enabling to obtain an optimal waveform equalization characteristic. The waveform equalization characteristic is automatically varied, which enables to compensate changes of a signal characteristic caused by characteristic change of an optical pickup by age or a temperature change as well as irregularities of the recording medium and to obtain an optimal waveform equalization characteristic. Moreover, the sampling clock of the analog-to-digital converting means is used as a synchronous clock, which enables to detect the aforementioned phase difference by a digital processing.

In the digital signal reproduction method according to the present invention, a phase difference between a digital signal and a synchronous clock generated from this digital signal is detected and according to this phase difference, the aforementioned transfer function is changed so as to reduce the aforementioned phase difference, thus enabling to obtain an optimal waveform equalization characteristic. As the waveform equalization characteristic is automatically varied, it is possible to compensate a change of a signal characteristic caused by a characteristic change of an optical pickup by age or a temperature change as well as irregularities of the recording medium, thus enabling to obtain an optimal waveform equalization characteristic.

Moreover, in the digital signal reproduction method according to the present invention, a synchronous clock generated is converted as a sampling clock into a digital data, so as to detect a phase difference between a transfer signal which has been waveform-equalized and the aforementioned synchronous clock. According to this phase difference, the aforementioned transfer function is changed so as to reduce the phase difference, which in turn reduces interference between signs of digital information transferred by a transfer signal, thus enabling to obtain an optimal waveform equalization characteristic. Since the waveform equalization characteristic is automatically varied, it is possible to compensate a change of signal characteristic caused by a characteristic change of an optical pickup by age or a temperature change as well as irregularities of the recording medium, thus enabling to obtain an optimal waveform equalization characteristic. Moreover, a transfer signal for transferring a digital information is converted into a transfer signal of a digital data by using the synchronous clock as a sampling clock, thus enabling to detect the aforementioned phase difference by a digital processing.

What is claimed is:

1. A digital signal reproduction circuit comprising:

waveform equalization means for waveform-equalizing with a predetermined transfer function a transfer signal for transferring digital information;

binarization means for generating a digital signal from said transfer signal by binarizing said transfer signal which has been waveform-equalized by said waveform equalization means;

synchronous clock generation means for generating a synchronous clock from the digital signal generated by said binarization means; and waveform equalization control means for controlling a transfer function of said waveform equalization means according to a phase difference between the digital signal generated by said binarization means and said clock, said waveform equalization control means controlling the transfer function of said waveform equalization means so as to reduce said phase difference; and said waveform equalization control means including a full wave rectifier circuit for rectifying a phase difference signal representing said phase difference between the digital signal generated by said binarization means and said clock, and a control circuit that controls said transfer function according to said rectified phase difference signal.

2. A digital signal reproduction circuit as claimed in claim 1, wherein said transfer signal is a regenerative signal reproduced from an optical disk.

3. The digital signal reproduction circuit as claimed in claim 1, further comprising a low pass filter coupled between said rectifier circuit and said control circuit for averaging the rectified phase difference signal prior to being supplied to said control circuit.

4. A digital signal reproduction circuit for reproducing a digital signal and a synchronous clock thereof from a transfer signal for transferring digital information, said circuit comprising:

waveform equalization means for waveform-equalizing said transfer signal with a predetermined transfer function;

analog-to-digital conversion means for converting said transfer signal for transferring the digital information into a digital data transfer signal, using said synchronous clock as a sampling clock;

binarization means for binarizing said digital data transfer signal so as to generate a digital signal from said transfer signal for transferring the digital information;

phase difference detecting means for detecting a phase difference between said transfer signal which has been waveform-equalized by said waveform equalization means and said synchronous clock, according to said digital data transfer signal;

synchronous clock generating means for generating a synchronous clock synchronized with said transfer signal which has been waveform-equalized, according to said phase difference detected by said phase difference detecting means; and waveform equalization control means for controlling said transfer function of said waveform equalization means according to said phase difference detected by said phase difference detection means;

said waveform equalization control means controlling said transfer function of said waveform equalization means so as to reduce said phase difference.

5. A digital signal reproduction circuit as claimed in claim 4, wherein said waveform equalization means comprises an analog filter for waveform-equalizing said transfer signal with a predetermined transfer function and waveform-equalizes the transfer signal with the predetermined transfer function before the transfer signal is converted into a digital data transfer signal by said analog-to-digital converting means.

6. A digital signal reproduction circuit as claimed in claim 4, wherein said waveform equalization means comprises a digital filter for waveform-equalizing said transfer signal with a predetermined transfer function and waveform-equalizes with the predetermined transfer function the transfer signal which has been converted into a digital data transfer signal by said analog-to-digital converting means.

7. A digital signal reproduction circuit as claimed in claim 6, wherein said digital filter comprises a plurality of delay stages having respective delay constants, a plurality of multipliers having respective multiplication constants and an adder for adding outputs of said multipliers, and said transfer function being controlled by varying at least one of said delay constants and at least one of said multiplication constants.

8. A digital signal reproduction circuit as claimed in claim 4, wherein said transfer signal is a regenerative signal reproduced from an optical disk.

9. A digital signal reproduction method comprising steps of:

waveform-equalizing with a predetermined transfer function a transfer signal for transferring a digital information;

binarizing the transfer signal which has been waveform-equalized, so as to generate a digital signal from said transfer signal;

detecting a phase difference between said digital signal and a synchronous clock which is generated from this digital signal;

full wave rectifying a phase difference signal representing said phase difference between said digital signal and said synchronous clock; and varying said transfer function according to said full wave rectified phase difference signal, so as to reduce said phase difference.

10. A digital signal reproduction method as claimed in claim 9, wherein said transfer signal is a regenerative signal reproduced from an optical disk.

11. A digital signal reproduction method as claimed in claim 9, further comprising the step of averaging said rectified phase difference signal by low pass filtering, and said transfer function being varied according to the averaged, rectified phase difference signal.

12. A digital signal reproduction method for reproducing a digital signal and a synchronous clock thereof from a transfer signal for transferring digital information, said method comprising steps of:

waveform-equalizing said transfer signal for transferring the digital information, with a predetermined transfer function;

converting said transfer signal for transferring the digital information, into a digital data transfer signal, using said synchronous clock as a sampling clock;

binarizing said digital data transfer signal so as to generate a digital signal from said transfer signal for transferring the digital information;

detecting a phase difference between the transfer signal which has been waveform-equalized and said synchronous clock, according to said digital data transfer signal;

generating, according to said phase difference detected, a synchronous clock synchronized with said transfer signal which has been waveform-equalized; and varying said transfer function according to said phase difference, so as to reduce said phase difference.

13. A digital signal reproduction method as claimed in claim 12, wherein said transfer signal is a regenerative signal reproduced from an optical disk.

14. A digital signal reproduction method as claimed in claim 12, wherein said waveform equalizing step includes digitally filtering said transfer signal with a digital filter comprising a plurality of delay stages having respective delay constants, a plurality of multipliers having respective multiplication constants, and an adder for adding outputs of said multipliers, and said step of varying said transfer function comprises varying at least one of said delay constants and at least one of said multiplication constants.

* * * * *